Patented Mar. 5, 1940

2,192,840

UNITED STATES PATENT OFFICE 2,192,840

METHOD OF PREPARING QUINUCLIDINE AND DERIVATIVES THEREOF

Vlado Prelog, Zagreb, Yugoslavia

No Drawing. Application July 30, 1938, Serial No. 222,280. In Yugoslavia August 6, 1937

8 Claims. (Cl. 260—293)

This invention relates to a method of preparing quinuclidine and its derivatives which include many compounds of therapeutic importance.

The synthesis of quinuclidine and its derivatives which include for example the alkaloids of cinchona bark has hitherto always been started from derivatives of piperidine which were almost exclusively made synthetically from the corresponding derivatives of pyridine. Examples are for example the preparation of quinuclidine by Löffler and Stietzel (Berichte 42., 124/1909) or Meisenheimer (Liebigs Annalen 420., 190/1920) or the preparation of β-ethyl-quinuclidine by König (Berichte 37., 3244/1904) as also the preparation dihydro-quinine and dihydro-quinidine by Rabe, Huntenburg, Schultze and Volger (Berichte 64., 2487/1931). These methods have various drawbacks. Thus for example in the synthesis of quinuclidine by Löffler and Stietzel or Meisenheimer, the first phase has the drawback that the condensation of the γ-picoline with formaldehyde gives a yield of only 1.2 to 1.5%. In other cases the initial substances as for example β-collidine (in the method according to König) are only obtained with difficulty.

According to the present invention quinuclidine and its derivatives of the general formula:

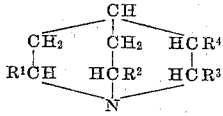

(in which $R^1$, $R^2$, $R^3$, $R^4$ represent hydrogen or an organic radical more particularly a hydrocarbon radical as for example methyl, ethyl or a group such as carboxyl) are prepared by allowing ammonia to act upon trihalogen derivatives of the general formula:

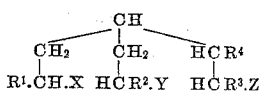

where $R^1$, $R^2$, $R^3$ and $R^4$ have the meaning given above and X, Y and Z represent halogen atoms which are similar or wholly or partly different from one another.

These trihalogen derivatives which have hitherto been described in the literature can be obtained by the action of hydrohalic acids (a) on such derivatives of tetrahydropyran as contained in a suitable position (U) a group which can easily be replaced by halogen such as an hydroxyl, alkoxy or phenoxy group.

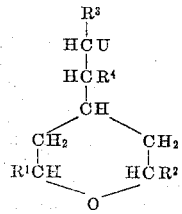

or (b) on such derivatives of tetrahydropyran

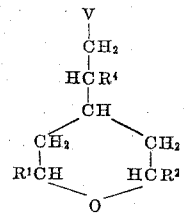

as possess in a suitable position V a group which facilitates the introduction of halogen into the molecule in the α-position with respect to it for example a carbonyl or carboxyl group. The dihalogen derivatives first obtained are converted into trihalogen derivatives by halogenisation.

The action of the ammonia on the initial material takes place at a raised temperature for example a temperature above 100° and in some cases at raised pressure. At the same time the use of suitable temperatures below 100° is included especially as choice of the temperature and pressure conditions to be employed is essentially only a question of time.

According to the invention quinuclidine and its derivatives are thus obtained by the action of ammonia on the above mentioned trihalogen derivatives. These can be obtained either by the action of only hydrohalic acids such as hydrobromic acid on derivatives of tetrahydropyran of the type referred to above under (a) in which case the tetrahydropyran ring is broken at the position of the oxygen and an atom of halogen becomes attached to each of the carbon atoms which are now free and a third halogen atom enters in place of the radical U, or by the action of the hydrogen halide on terahydropyran compounds of the type referred to above under (b) in which case the ring is broken and at first only dihalogen compounds are obtained in which the third halogen atom can be introduced by halogenisation.

The new products according to the invention are intended to be used for therapeutic purposes.

*Examples*

(1) One part by weight of 4-β-hydroxyethyl-tetrahydropyran is heated for six hours to 100–110° C. with 25 parts by weight of 66% hydrobromic acid. By working up the reaction mixture there is obtained 3-(2-bromo-ethyl)-1,5-dibromopentane with 80% of the theoretical yield in the form of an oil insoluble in water with a boiling point 185–186° at 17 mm. mercury.

1 part of this tribromo derivative is heated to 130–140° for three hours in an autoclave with 6 parts of a 20% solution of ammonia in methyl alcohol. By working up the product there is obtained 50% of the theoretical yield of quinuclidine as a colourless camphor-like substance melting at 158–159°.

In a similar manner β-ethyl-quinuclidine can be obtained from 4-β-hydroxybutyl-tetrahydropyran.

(2) One part by weight of tetrahydropyran propionic acid-(4) is heated for six hours with 16 parts by weight of 66% hydrobromic acid. The oily 1,5-dibromo-pentane-propionic acid-(3) thus obtained is brominated in a known manner according to Hell, Volhard, Zelinsky with bromine and red phosphorus and the bromide of the tribromo acid is converted into ester. The ester of the 1,5-dibromo-pentane-α-bromo-propionic acid-(3) is again heated for six hours with 6 parts of a 20% solution of ammonia in methyl alcohol. By hydrolysing the reaction product with barium hydroxide there is obtained after removing the barium ion with sulphuric acid, the hydrobromide of the quinuclidine carboxylic acid-(2) in the form of white crystals which can be recrystallised from water. The quinuclidine carboxylic acid-(2) itself can be obtained by means of silver oxide. It forms white crystals which are soluble in water and soluble with difficulty in acetone and ether.

What I claim is:

1. A process for preparing quinuclidine and derivatives thereof comprising allowing ammonia to act upon trihalogen derivatives of the type

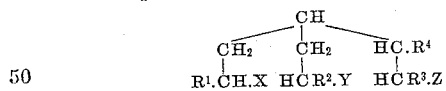

where X, Y, Z represent halogen, and $R^1$, $R^2$, $R^3$, $R^4$ are radicals selected from the group of radicals consisting of: hydrocarbon radicals, radicals comprising carboxyl groups and hydrogen.

2. A process as claimed in claim 1 in which the action of the ammonia takes place at a raised temperature.

3. A process as claimed in claim 1 in which the action of the ammonia takes place at raised pressure.

4. A process as claimed in claim 1 in which the action of the ammonia takes place at a temperature above 100° C., e. g. 130–140° C.

5. A process for preparing quinuclidine and derivatives thereof comprising obtaining 3-(2-bromethyl)-1,5-dibromopentane by the action of hydrobromic acid on 4-β-hydroxyethyl-tetrahydropyran, and converting the former into quinuclidine by reaction with ammonia.

6. A process for preparing quinuclidine and derivatives thereof comprising obtaining 3-(2-brombutyl)-1,5-dibromopentane by the action of hydrobromic acid on 4-β-hydroxybutyl-tetrahydropyran and converting the former into quinuclidine by reaction with ammonia.

7. A process for preparing quinuclidine and derivatives thereof comprising causing hydrobromic acid to react with tetrahydropyran-propionic acid to form 1,5-dibromopentane-propionic acid, treating this with bromine, converting the 1,5-dibromopentane-α-bromopropionic acid thus obtained into ester, treating the ester with ammonia, converting the product obtained into the hydrobromide of quinuclidine-carboxylic acid by hydrolysis, and obtaining quinuclidine-carboxylic acid from the hydrobromide by means of silver oxide.

8. A process for preparing quinuclidine and derivatives thereof, comprising allowing ammonia to act upon trihalogen derivatives of the type

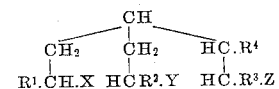

where X, Y, Z represent halogen, and $R^1$, $R^2$, $R^3$, $R^4$ are radicals selected from the group of radicals consisting of: alkyl radicals, radicals comprising carboxyl groups, and hydrogen.

VLADO PRELOG.